(12) United States Patent
Cho et al.

(10) Patent No.: US 9,512,903 B2
(45) Date of Patent: Dec. 6, 2016

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/822,235

(22) Filed: Aug. 10, 2015

(65) Prior Publication Data

US 2016/0169333 A1    Jun. 16, 2016

(30) Foreign Application Priority Data

Dec. 11, 2014    (KR) .................. 10-2014-0178388

(51) Int. Cl.
*F16H 3/62*  (2006.01)
*F16H 3/66*  (2006.01)

(52) U.S. Cl.
CPC ......... *F16H 3/66* (2013.01); *F16H 2200/0073* (2013.01); *F16H 2200/2012* (2013.01); *F16H 2200/2046* (2013.01); *F16H 2200/2097* (2013.01)

(58) Field of Classification Search
CPC ............... F16H 3/66; F16H 2200/0073; F16H 2200/2012; F16H 2200/2046; F16H 2200/2097
See application file for complete search history.

(56) References Cited

U.S. PATENT DOCUMENTS 9,005,073 B1 * 4/2015 Noh .................. F16H 3/66 475/282
2009/0017977 A1 * 1/2009 Phillips ................ F16H 3/66 475/276

(Continued)

FOREIGN PATENT DOCUMENTS

JP    2009-197927 A    9/2009
JP    2013-72464 A    4/2013

(Continued)

*Primary Examiner* — David J Hlavka
(74) *Attorney, Agent, or Firm* — Morgan, Lewis & Bockius LLP

(57) ABSTRACT

A planetary gear train of an automatic transmission for a vehicle may include an input shaft into which power of an engine is input, an output shaft that outputs the shifted power, a first planetary gear set, a second planetary gear set, a third planetary gear set, a fourth planetary gear set, a first rotational shaft selectively connected to a transmission housing, a second rotational shaft directly connected to the input shaft, a third rotational shaft, a fourth rotational shaft, a fifth rotational shaft selectively connected to the first rotational shaft and the second rotational shaft, a sixth rotational shaft directly connected to the output shaft, and selectively connected to the fourth rotational shaft, a seventh rotational shaft selectively connected to the transmission housing, an eighth rotational shaft selectively connected to the fifth rotational shaft, and six friction elements.

9 Claims, 2 Drawing Sheets

(56) References Cited

U.S. PATENT DOCUMENTS

| | | | |
|---|---|---|---|
| 2010/0190600 A1* | 7/2010 | Phillips | F16H 3/66 475/275 |
| 2010/0210404 A1* | 8/2010 | Phillips | F16H 3/66 475/282 |
| 2010/0216589 A1* | 8/2010 | Hart | F16H 3/66 475/275 |
| 2013/0260947 A1* | 10/2013 | Mellet | F16H 3/62 475/276 |
| 2014/0113762 A1* | 4/2014 | Goleski | F16D 25/10 475/279 |
| 2015/0369342 A1* | 12/2015 | Kato | F16H 3/66 475/275 |

FOREIGN PATENT DOCUMENTS

| | | |
|---|---|---|
| KR | 10-2012-0132022 A | 12/2012 |
| KR | 10-2014-0046240 A | 4/2014 |

\* cited by examiner

FIG. 2

|      | C1 | C2 | C3 | C4 | B1 | B2 | Gear ratio |
|------|----|----|----|----|----|----|------------|
| 1ST  | O  | O  |    |    |    | O  | 10.392     |
| 2ND  |    | O  | O  |    |    | O  | 6.733      |
| 3RD  | O  |    | O  |    |    | O  | 4.700      |
| 4TH  |    |    | O  |    | O  | O  | 3.021      |
| 5TH  |    |    | O  | O  |    | O  | 1.972      |
| 6TH  |    |    | O  | O  | O  |    | 1.247      |
| 7TH  | O  |    | O  | O  |    |    | 1.000      |
| 8TH  | O  |    |    | O  | O  |    | 0.777      |
| 9TH  |    | O  |    | O  | O  |    | 0.643      |
| 10TH | O  | O  |    |    | O  |    | 0.522      |
| 11TH |    | O  | O  |    | O  |    | 0.390      |
| REV  | O  |    |    | O  |    | O  | 2.938      |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2014-0178388 filed Dec. 11, 2014, the entire contents of which is incorporated herein for all purposes by this reference.

BACKGROUND OF THE INVENTION

Field of the Invention

The present invention relates to an automatic transmission for vehicles. More particularly, the present invention relates to a planetary gear train of an automatic transmission for vehicles that implement 11 forward speeds with a minimal configuration to improve power transmission performance and fuel efficiency.

Description of Related Art

In recent years, a rise in the price of oil has caused unlimited competition for enhancing fuel efficiency.

As a result, research into reduction of weight and enhancement of fuel efficiency through down-sizing is being conducted in the case of an engine, and research for simultaneously securing operability and fuel efficiency competitiveness through multi-stages is being conducted in the case of an automatic transmission.

However, in the automatic transmission, as the number of speeds increases, the number of internal components increases, and as a result, mountability, transmission efficiency, and the like may still deteriorate, and cost and weight may increase.

Accordingly, development of a planetary gear train which may bring about maximum efficiency with a small number of components is important in order to increase a fuel efficiency enhancement effect through the multi-stages.

In this aspect, in recent years, 8- and 9-speed automated transmissions have tended to be implemented, and research and development of a planetary gear train capable of implementing more speeds has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automatic transmission for vehicles that implements eleven forward speeds and one reverse speed with a minimal configuration, and that improves power transmission efficiency and fuel consumption through multiple speeds.

According to various aspects of the present invention, a planetary gear train of an automatic transmission for a vehicle may include an input shaft into which power of an engine is input, an output shaft that outputs the shifted power, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft including the first sun gear and selectively connected to a transmission housing, a second rotational shaft including the first planetary carrier and directly connected to the input shaft, a third rotational shaft including the first ring gear, the second planetary carrier, the third sun gear, and the fourth sun gear, a fourth rotational shaft including the second sun gear, a fifth rotational shaft including the second ring gear and selectively connected to the first rotational shaft and the second rotational shaft, a sixth rotational shaft including the fourth planetary carrier, directly connected to the output shaft, and selectively connected to the fourth rotational shaft, a seventh rotational shaft including the third planetary carrier and the fourth ring gear, and selectively connected to the transmission housing, an eighth rotational shaft including the third ring gear, and selectively connected to the fifth rotational shaft, and six friction elements selectively connecting the rotational shafts to the transmission housing, and one of the rotational shafts to another of the rotational shafts.

Each of the first, second, third, and fourth planetary gear sets may be configured as a single pinion planetary gear set.

The first, second, third, and fourth planetary gear sets may be sequentially disposed from an engine side.

The six friction elements may include a first clutch interposed between the second rotational shaft and the fifth rotational shaft, a second clutch interposed between the fourth rotational shaft and the sixth rotational shaft, a third clutch interposed between the first rotational shaft and the fifth rotational shaft, a fourth clutch interposed between the fifth rotational shaft and the eighth rotational shaft, a first brake interposed between the first rotational shaft and the transmission housing, and a second brake interposed between the seventh rotational shaft and the transmission housing.

Speeds implemented by selectively operating the six friction elements may include a first forward speed implemented by simultaneously operating the first clutch, the second clutch, and the second brake, a second forward speed implemented by simultaneously operating the second clutch, the third clutch, and the second brake, a third forward speed implemented by simultaneously operating the first clutch, the third clutch, and the second brake, a fourth forward speed implemented by simultaneously operating the third clutch, the first brake, and the second brake, a fifth forward speed implemented by simultaneously operating the third clutch, the fourth clutch, and the second brake, a sixth forward speed implemented by simultaneously operating the third clutch, the fourth clutch, and the first brake, a seventh forward speed implemented by simultaneously operating the first clutch, the third clutch, and the fourth clutch, an eighth forward speed implemented by simultaneously operating the first clutch, the fourth clutch, and the first brake, a ninth forward speed implemented by simultaneously operating the second clutch, the fourth clutch, and the first brake, a tenth forward speed implemented by simultaneously operating the first clutch, the second clutch, and the first brake, an eleventh forward speed implemented by simultaneously operating the second clutch, the third clutch, and the first brake, and a reverse speed implemented by simultaneously operating the first clutch, the fourth clutch, and the second brake.

According to various aspects of the present invention, a planetary gear train of an automatic transmission for a vehicle may include an input shaft into which power of an engine to be shifted is input, an output shaft that outputs the shifted power, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, and a fourth planetary gear set including a fourth sun gear, a fourth planetary carrier, and a fourth ring gear, in which the input shaft may be directly connected to the first planetary carrier, the output shaft may be connected to the fourth planetary carrier, the first ring gear, the second planetary carrier, the third sun gear, and the fourth sun gear may be directly connected to each other, the third planetary carrier and the fourth ring gear may be directly connected, and may further include a first clutch selectively connecting the first planetary carrier and the second ring gear, a second clutch selectively connecting the second sun gear and the fourth planetary carrier, a third clutch selectively connecting the first sun gear and the second ring gear, a fourth clutch selectively connecting the second ring gear and the third ring gear, a first brake selectively connecting the first sun gear and a transmission housing, and a second brake selectively connecting the fourth ring gear and the transmission housing.

Speeds implemented by selectively operating the clutches and the brakes include a first forward speed implemented by simultaneously operating the first clutch, the second clutch, and the second brake, a second forward speed implemented by simultaneously operating the second clutch, the third clutch, and the second brake, a third forward speed implemented by simultaneously operating the first clutch, the third clutch, and the second brake, a fourth forward speed implemented by simultaneously operating the third clutch, the first brake, and the second brake, a fifth forward speed implemented by simultaneously operating the third clutch, the fourth clutch, and the second brake, a sixth forward speed implemented by simultaneously operating the third clutch, the fourth clutch, and the first brake, a seventh forward speed implemented by simultaneously operating the first clutch, the third clutch, and the fourth clutch, an eighth forward speed implemented by simultaneously operating the first clutch, the fourth clutch, and the first brake, a ninth forward speed implemented by simultaneously operating the second clutch, the fourth clutch, and the first brake, a tenth forward speed implemented by simultaneously operating the first clutch, the second clutch, and the first brake, an eleventh forward speed implemented by simultaneously operating the second clutch, the third clutch, and the first brake, and a reverse speed implemented by simultaneously operating the first clutch, the fourth clutch, and the second brake.

According to various embodiments of the present invention, eleven forward speeds and one reverse speed are implemented by combining four planetary gear sets configured by simple planetary gear sets with six friction elements to improve power transmission performance and fuel efficiency.

Further, the planetary gear train according to various embodiments of the present invention may improve the power transmission efficiency and the fuel efficiency through the multiple speeds of the automatic transmission.

BRIEF DESCRIPTION OF THE DRAWINGS

FIG. 2 is an operation table for each of speeds of respective friction elements applied to the exemplary planetary gear train according to the present invention.

Figure 1:
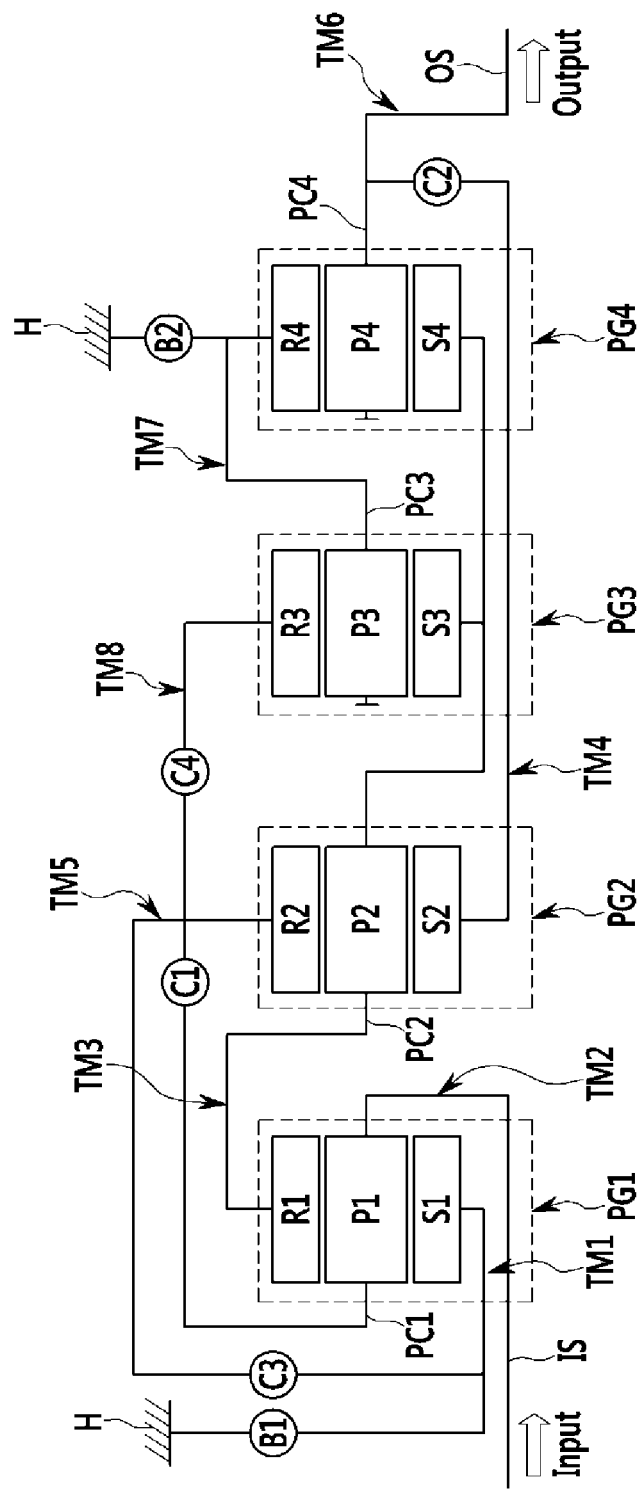
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiment of the present invention.

Referring to FIG. 1, a planetary gear train according to various embodiments of the present invention includes first, second, third, and fourth planetary gear sets PG1, PG2, PG3, and PG4 disposed on a same axial line, an input shaft IS, an output shaft OS, eight rotational shafts TM1 to TM8 that directly connect respective rotational elements of the first, second, third, and fourth planetary gear sets PG1, PG2, PG3, and PG4 to each other, six friction elements C1 to C4 and B1 to B2, and a transmission housing H.

Rotation power input from the input shaft IS is transmitted by an inter-complementation operation of the first, second, third, and fourth planetary gear sets PG1, PG2, PG3, and PG4 to be output through the output shaft OS.

In addition, the respective simple planetary gear sets are disposed in the order of the first, second, third, and fourth planetary gear sets PG1, PG2, PG3, and PG4 from an engine side.

The input shaft IS is an input member, and rotational power from a crankshaft of an engine is torque-converted through a torque converter to be input into the input shaft IS.

The output shaft OS as an output member is disposed on the same axial line as the input shaft IS to transmit transmitted driving power to a driving shaft through a differential.

The first planetary gear set PG1 as a single-pinion planetary gear set includes a first sun gear S1, a first planetary carrier PC1 that rotatably supports a first pinion P1 which outer-engages with the first sun gear S1, and a first ring gear R1 which inner-engages with the first pinion P1 as rotation elements.

The second planetary gear set PG2 as a single-pinion planetary gear set includes a second sun gear S2, a second planetary carrier PC2 that rotatably supports a second pinion P2 which outer-engages with the second sun gear S2, and a second ring gear R2 which inner-engages with the second pinion P2.

The third planetary gear set PG3 as the single-pinion planetary gear set includes a third sun gear S3, a third planetary carrier PC3 that rotatably supports a third pinion P3 which outer-engages with the third sun gear S3, and a third ring gear R3 which inner-engages with the third pinion P3.

The fourth planetary gear set PG4 as the single-pinion planetary gear set includes a fourth sun gear S4, a fourth planetary carrier PC4 that rotatably supports a fourth pinion P4 which outer-engages with the fourth sun gear S4, and a fourth ring gear R4 which inner-engages with the fourth pinion P4.

In the first, second, third, and fourth planetary gear sets PG1, PG2, PG3, and PG4, one or more rotation elements are directly connected to each other to operate with a total of eight rotational shafts TM1 to TM8.

In the third and fourth planetary gear sets PG3 and PG4, two rotation elements are directly connected to each other to operate with a total of four rotation elements.

Configurations of the eight rotational shafts TM1 to TM8 will be described below.

The first rotational shaft TM1 is configured to include the first sun gear S1, and is selectively connected to the transmission housing H.

The second rotational shaft TM2 is configured to include the first planetary carrier PC1, and continuously operates as the input element while being directly connected to the input shaft IS.

The third rotational shaft TM3 is configured to include the first ring gear R1, the second planetary carrier PC2, the third sun gear S3, and the fourth sun gear S4.

The fourth rotational shaft TM4 is configured to include the second sun gear S2.

The fifth rotational shaft TM5 is configured to include the second ring gear R2, and is selectively connected to the first rotational shaft TM1 and the second rotational shaft TM2.

The sixth rotational shaft TM6 is configured to include the fourth planetary carrier PC4, is directly connected to the output shaft OS, and is selectively connected to the fourth rotational shaft TM4.

The seventh rotational shaft TM7 is configured to include the third planetary carrier PC3 and the fourth ring gear R4, and is selectively connected to the transmission housing H.

The eighth rotational shaft TM8 is configured to include the third ring gear R3, and is selectively connected to the fifth rotational shaft TM5.

In addition, among the rotational shafts TM1 to TM8, four clutches C1, C2, C3, and C4 which are friction elements are disposed at portions where the rotational shafts are selectively connected to each other.

Further, among the rotational shafts TM1 to TM8, two brakes B1 and B2 which are the friction elements are disposed at portions selectively connected to the transmission housing H.

Layout positions of the six friction elements C1 to C4 and B1 to B2 will be described below.

The first clutch C1 is interposed between the second rotational shaft TM2 and the fifth rotational shaft TM5, and as a result, the second rotational shaft TM2 and the fifth rotational shaft TM5 are selectively integrated with each other.

The second clutch C2 is interposed between the fourth rotational shaft TM4 and the sixth rotational shaft TM6, and as a result, the fourth rotational shaft TM4 and the sixth rotational shaft TM6 are selectively integrated with each other.

The third clutch C3 is interposed between the first rotational shaft TM1 and the fifth rotational shaft TM5, and as a result, the first rotational shaft TM1 and the fifth rotational shaft TM5 are selectively integrated with each other.

The fourth clutch C4 is interposed between the fifth rotational shaft TM5 and the eighth rotational shaft TM8, and as a result, the fifth rotational shaft TM5 and the eighth rotational shaft TM8 are selectively integrated with each other.

The first brake B1 is interposed between the first rotational shaft TM1 and the transmission housing H to allow the first rotational shaft TM1 to operate as a selective fixing element.

The second brake B2 is interposed between the seventh rotational shaft TM7 and the transmission housing H to allow the seventh rotational shaft TM7 to operate as a selective fixing element.

The respective friction elements include the first, second, third, and fourth clutches C1, C2, C3, and C4 and the first and second brakes B1 and B2 as described above may be configured by multiple-disk hydraulic friction joining units which are friction joined by hydraulic pressure.

FIG. 2 is an operation table for each of speeds of respective friction elements applied to the planetary gear train according to various embodiments of the present invention.

As shown in FIG. 2, in the planetary gear train according to various embodiments of the present invention, while three friction elements operate in the respective speeds, power transmission is performed.

A first forward speed 1ST is implemented by simultaneously operating the first and second clutches C1 and C2 and the second brake B2.

A second forward speed 2ND is implemented by simultaneously operating the second and third clutches C2 and C3 and the second brake B2.

A third forward speed 3RD is implemented by simultaneously operating the first and third clutches C1 and C3 and the second brake B2.

A fourth forward speed 4TH is implemented by simultaneously operating the third clutch C3 and the first and second brakes B1 and B2.

A fifth forward speed 5TH is implemented by simultaneously operating the third and fourth clutches C3 and C4 and the second brake B2.

A sixth forward speed 6TH is implemented by simultaneously operating the third and fourth clutches C3 and C4 and the first brake B1.

A seventh forward speed 7TH is implemented by simultaneously operating the first, third, and fourth clutches C1, C3, and C4.

An eighth forward speed 8TH is implemented by simultaneously operating the first and fourth clutches C1 and C4 and the first brake B1.

A ninth forward speed 9TH is implemented by simultaneously operating the second and fourth clutches C2 and C4 and the first brake B1.

A tenth forward speed 10TH is implemented by simultaneously operating the first and second clutches C1 and C2 and the first brake B1.

An eleventh forward speed 11TH is implemented by simultaneously operating the second and third clutches C2 and C3 and the first brake B1.

A reverse speed REV is implemented by simultaneously operating the first and fourth clutches C1 and C4 and the second brake B2.

The above shifting processes will be described in detail.

In the first forward speed 1ST, when the first and second clutches C1 and C2 and the second brake B2 are simultaneously operated, the second rotational shaft TM2 is connected to the fifth rotational shaft TM5 by operation of the first clutch C1. The fourth rotational shaft TM4 is connected to the sixth rotational shaft TM6 by operation of the second clutch C2, and the second rotational shaft TM2 receives driving power. The seventh rotational shaft TM7 is operated as a fixed element by operation of the second brake B2, the first forward speed is realized, and thus driving power is output though the sixth rotational shaft TM6.

In the second forward speed 2ND, when the second and third clutches C2 and C3 and the second brake B2 are simultaneously operated, the fourth rotational shaft TM4 is connected to the rotational shaft TM6 by operation of the second clutch C2. The first rotational shaft TM1 is connected to the fifth rotational shaft TM5 by operation of the third clutch C3, and the second rotational shaft TM2 receives driving power. The seventh rotational shaft TM7 is operated as a fixed element by operation of the second brake B2, the second forward speed is realized, and thus driving power is output through the sixth rotational shaft TM6.

In the third forward speed 3RD, when the first and third clutches C1 and C3 and the second brake B2 are simultaneously operated, the second rotational shaft TM2 is connected to the fifth rotational shaft TM5 by operation of the first clutch C1. The first rotational shaft TM1 is connected to the fifth rotational shaft TM5 by operation of the third clutch C3, and the second rotational shaft TM2 receives driving power. The seventh rotational shaft TM7 is operated as a fixed element by operation of the second brake B2, the third forward speed is realized, and thus driving power is output though the sixth rotational shaft TM6.

In the fourth forward speed 4TH, when the third clutch C3 and the first and second brakes B1 and B2 are simultaneously operated, the first rotational shaft TM1 is connected to the fifth rotational shaft TM5 by operation of the third clutch C3, and the second rotational shaft TM2 receives driving power. The first rotational shaft TM1 and the seventh rotational shaft TM7 are operated as a fixed element by operation of the first and second brakes B1 and B2, the fourth forward speed is realized, and thus driving power is output through the sixth rotational shaft TM6.

In the fifth forward speed 5TH, when the third and fourth clutches C3 and C4 and the second brake B2 are simultaneously operated, the first rotational shaft TM1 is connected to the fifth rotational shaft TM5 by operation of the third clutch C3. The fifth rotational shaft TM5 is connected to the eighth rotational shaft TM8 by operation of the fourth clutch C4, and the second rotational shaft TM2 receives driving power. The seventh rotational shaft TM7 is operated as a fixed element by operation of the second brake B2, the fifth forward speed is realized, and thus driving power is output though the sixth rotational shaft TM6.

In the sixth forward speed 6TH, when the third and fourth clutches C3 and C4 and the first brake B1 are simultaneously operated, the first rotational shaft TM1 is connected to the fifth rotational shaft TM5 by operation of the third clutch C3. The fifth rotational shaft TM5 is connected to the eighth rotational shaft TM8 by operation of the fourth clutch C4, and the second rotational shaft TM2 receives driving power. The first rotational shaft TM1 is operated as a fixed element by operation of the first brake B1, the sixth forward speed is realized, and thus driving power is output though the sixth rotational shaft TM6.

In the seventh forward speed 7TH, when the first, third, and fourth clutches C1, C3, and C4 are simultaneously operated, the second rotational shaft TM2 is connected to the fifth rotational shaft TM5 by operation of the first clutch C1. The first rotational shaft TM1 is connected to the fifth rotational shaft TM5 by operation of the third clutch C3. The fifth rotational shaft TM5 is connected to the eighth rotational shaft TM8 by operation of the fourth clutch C4 and the second rotational shaft TM2 receives driving power, the seventh forward speed is realized, and thus driving power is output through the sixth rotational shaft TM6.

In the eighth forward speed 8TH, when the first and fourth clutches C1 and C4 and the first brake B1 are simultaneously operated, the second rotational shaft TM2 is connected to the fifth rotational shaft TM5 by operation of the first clutch C1. The fifth rotational shaft TM5 is connected to the eighth rotational shaft TM8 by operation of the fourth clutch C4, and the second rotational shaft TM2 receives driving power. The first rotational shaft TM1 is operated as a fixed element by operation of the first brake B1, the eighth forward speed is realized, and thus driving power is output through the sixth rotational shaft TM6.

In the ninth forward speed 9TH, when the second and fourth clutches C2 and C4 and the first brake B1 are simultaneously operated, the fourth rotational shaft TM4 is connected to the sixth rotational shaft TM6 by operation of the second clutch C2. The fifth rotational shaft TM5 is connected to the eighth rotational shaft TM8 by operation of the fourth clutch C4, and the second rotational shaft TM2 receives driving power. The first rotational shaft TM1 is operated as a fixed element by operation of the first brake B1, the ninth forward speed is realized, and thus driving power is output through the sixth rotational shaft TM6.

In the tenth forward speed 10TH, when the first and second clutches C1 and C2 and the first brake B1 are simultaneously operated, the second rotational shaft TM2 is connected to the fifth rotational shaft TM5 by operation of the first clutch C1. The fourth rotational shaft TM4 is connected to the sixth rotational shaft TM6 by operation of the second clutch C2, and the second rotational shaft TM2 receives driving power. The first rotational shaft TM1 is operated as a fixed element by operation of the first brake B1, the tenth forward speed is realized, and thus driving power is output through the sixth rotational shaft TM6.

In the eleventh forward speed 11TH, when the second and third clutches C2 and C3 and the first brake B1 are simultaneously operated, the fourth rotational shaft TM4 is connected to the sixth rotational shaft TM6 by operation of the second clutch C2. The first rotational shaft TM1 is connected to the fifth rotational shaft TM5 by operation of the third clutch C3, and the second rotational shaft TM2 receives driving power. The first rotational shaft TM1 is operated as a fixed element by operation of the first brake B1, the eleventh forward speed is realized, and thus driving power is output through the sixth rotational shaft TM6.

In the reverse speed REV, when the first and fourth clutches C1 and C4 and the second brake B2 are simultaneously operated, the second rotational shaft TM2 is connected to the fifth rotational shaft TM5 by operation of the first clutch C1. The fifth rotational shaft TM5 is connected to the eighth rotational shaft TM8 by operation of the fourth clutch C3, and the second rotational shaft TM2 receives driving power. The seventh rotational shaft TM7 is operated as a fixed element by operation of the second brake B2, the reverse speed is realized, and thus driving power is output through the sixth rotational shaft TM6.

As described above, in the planetary gear train according to various embodiments of the present invention, four planetary gear sets PG1, PG2, PG3, and PG4 may implement the eleven forward speeds and one reverse speed through the operation-control of four clutches C1, C2, C3, and C4 and two brakes B1 and B2.

Further, the planetary gear train according to various embodiments of the present invention may improve the power transmission efficiency and the fuel efficiency through the multi-stages of the automatic transmission.

The planetary gear train according to various embodiments of the present invention may also improve the power transmission efficiency and the fuel efficiency through the multiple speeds of the automatic transmission.

In addition, three friction elements operate for each speed, and as a result, a friction drag loss is decreased by minimizing the number of friction elements which operate, thereby improving the power transmission efficiency and the fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft configured for receiving an engine torque;
    an output shaft configured for outputting a shifted torque;
    a first planetary gear set including a first sun gear, a first planetary carrier, and a first ring gear;
    a second planetary gear set including a second sun gear, a second planetary carrier, and a second ring gear;
    a third planetary gear set including a third sun gear, a third planetary carrier, and a third ring gear;
    a fourth planetary gear set including a fourth sun gear, a fourth planetary carrier, and a fourth ring gear;
    a first rotational shaft directly connected to the first sun gear and selectively connected to a transmission housing;
    a second rotational shaft directly connected to the first planetary carrier and the input shaft;
    a third rotational shaft directly connected to the first ring gear, the second planetary carrier, the third sun gear, and the fourth sun gear;
    a fourth rotational shaft directly connected to the second sun gear;
    a fifth rotational shaft directly connected to the second ring gear and selectively connected to the first rotational shaft and the second rotational shaft;
    a sixth rotational shaft directly connected to the fourth planetary carrier and the output shaft, and selectively connected to the fourth rotational shaft;
    a seventh rotational shaft directly connected to the third planetary carrier and the fourth ring gear, and selectively connected to the transmission housing;
    an eighth rotational shaft directly connected to the third ring gear, and selectively connected to the fifth rotational shaft.

2. The planetary gear train of claim 1, wherein each of the first, second, third, and fourth planetary gear sets comprises a single pinion planetary gear set.

3. The planetary gear train of claim 2, wherein the first, second, third, and fourth planetary gear sets are sequentially disposed from an engine side.

4. The planetary gear train of claim 1, further comprising six friction elements including:

a first clutch interposed between the second rotational shaft and the fifth rotational shaft to selectively connect the second rotational shaft with the fifth rotational shaft;
a second clutch interposed between the fourth rotational shaft and the sixth rotational shaft to selectively connect the fourth rotational shaft with the sixth rotational shaft;
a third clutch interposed between the first rotational shaft and the fifth rotational shaft to selectively connect the first rotational shaft with the fifth rotational shaft;
a fourth clutch interposed between the fifth rotational shaft and the eighth rotational shaft to selectively connect the fifth rotational shaft with the eighth rotational shaft;
a first brake interposed between the first rotational shaft and the transmission housing to selectively connect the first rotational shaft to the transmission housing; and
a second brake interposed between the seventh rotational shaft and the transmission housing to selectively connect the seventh rotational shaft to the transmission housing.

5. The planetary gear train of claim 4, wherein speeds implemented by selectively operating the six friction elements include:
    a first forward speed implemented by operating the first clutch, the second clutch, and the second brake;
    a second forward speed implemented by operating the second clutch, the third clutch, and the second brake;
    a third forward speed implemented by operating the first clutch, the third clutch, and the second brake;
    a fourth forward speed implemented by operating the third clutch, the first brake, and the second brake;
    a fifth forward speed implemented by operating the third clutch, the fourth clutch, and the second brake;
    a sixth forward speed implemented by operating the third clutch, the fourth clutch, and the first brake;
    a seventh forward speed implemented by operating the first clutch, the third clutch, and the fourth clutch;
    an eighth forward speed implemented by operating the first clutch, the fourth clutch, and the first brake;
    a ninth forward speed implemented by operating the second clutch, the fourth clutch, and the first brake;
    a tenth forward speed implemented by operating the first clutch, the second clutch, and the first brake;
    an eleventh forward speed implemented by operating the second clutch, the third clutch, and the first brake; and
    a reverse speed implemented by operating the first clutch, the fourth clutch, and the second brake.

6. A planetary gear train of an automatic transmission for a vehicle, comprising:
    an input shaft configured for receiving an engine torque;
    an output shaft configured for outputting a shifted torque;
    a first planetary gear set including a first sun gear, a first planetary carrier, and a first ring gear;
    a second planetary gear set including a second sun gear, a second planetary carrier, and a second ring gear;
    a third planetary gear set including a third sun gear, a third planetary carrier, and a third ring gear;
    a fourth planetary gear set including a fourth sun gear, a fourth planetary carrier, and a fourth ring gear,
    wherein:
        the input shaft is the first planetary carrier;
        the output shaft is connected to the fourth planetary carrier;

the first ring gear, the second planetary carrier, the third sun gear, and the fourth sun gear are each directly connected to each other; and the third planetary carrier and the fourth ring gear are directly connected;

a first clutch selectively connecting the first planetary carrier and the second ring gear;

a second clutch selectively connecting the second sun gear and the fourth planetary carrier;

a third clutch selectively connecting the first sun gear and the second ring gear;

a fourth clutch selectively connecting the second ring gear and the third ring gear;

a first brake selectively connecting the first sun gear and a transmission housing; and a second brake selectively connecting the fourth ring gear and the transmission housing.

7. The planetary gear train of the automatic transmission for the vehicle of claim 6, wherein each of the first, second, third, and fourth planetary gear sets comprises a single-pinion planetary gear set.

8. The planetary gear train of the automatic transmission for the vehicle of claim 6, wherein the first, second, third, and fourth planetary gear sets are sequentially disposed from an engine side.

9. The planetary gear train of the automatic transmission for the vehicle of claim 6, wherein speeds implemented by selectively operating the first, second, third, and fourth clutches and the first and second brakes include:

a first forward speed implemented by operating the first clutch, the second clutch, and the second brake;

a second forward speed implemented by operating the second clutch, the third clutch, and the second brake;

a third forward speed implemented by operating the first clutch, the third clutch, and the second brake;

a fourth forward speed implemented by operating the third clutch, the first brake, and the second brake;

a fifth forward speed implemented by operating the third clutch, the fourth clutch, and the second brake;

a sixth forward speed implemented by operating the third clutch, the fourth clutch, and the first brake;

a seventh forward speed implemented by operating the first clutch, the third clutch, and the fourth clutch;

an eighth forward speed implemented by operating the first clutch, the fourth clutch, and the first brake;

a ninth forward speed implemented by operating the second clutch, the fourth clutch, and the first brake;

a tenth forward speed implemented by operating the first clutch, the second clutch, and the first brake;

an eleventh forward speed implemented by operating the second clutch, the third clutch, and the first brake; and a reverse speed implemented by operating the first clutch, the fourth clutch, and the second brake.

* * * * *